United States Patent [19]

Ahner

[11] Patent Number: 4,683,268

[45] Date of Patent: Jul. 28, 1987

[54] PRESSURE SENSITIVE ADHESIVE USING LIGHT COLOR, LOW SOFTENING POINT PETROLEUM HYDROCARBON RESINS

[75] Inventor: Mary E. Ahner, Baton Rouge, La.

[73] Assignee: Exxon Chemical Patents Inc., Linden, N.J.

[21] Appl. No.: 830,410

[22] Filed: Feb. 18, 1986

[51] Int. Cl.$^4$ ............................................. C08L 47/00
[52] U.S. Cl. ................... 525/237; 525/232; 526/290
[58] Field of Search ............... 526/290; 525/232, 236, 525/237

[56] References Cited

U.S. PATENT DOCUMENTS

| | | | |
|---|---|---|---|
| 3,813,357 | 5/1974 | St. Cyr | 260/5 |
| 3,853,826 | 12/1974 | St. Cyr | 260/80.7 |
| 4,046,838 | 9/1977 | Feeney | 526/290 |
| 4,098,983 | 7/1978 | Osborn | 526/290 |
| 4,391,961 | 7/1983 | Small et al. | 526/76 |
| 4,514,554 | 4/1985 | Hughes | 526/290 |

*Primary Examiner*—Paul R. Michl
*Attorney, Agent, or Firm*—J. F. Hunt

[57] ABSTRACT

An adhesive comprising a copolymer and a light color petroleum hydrocarbon resin including an aromatic hydrocarbon component useful for tackifying copolymers is described. The resin used has a softening point of about 0° C. to about 40° C., a number average molecular weight (Mn) of from 100 to 600 and a molecular weight distribution (Mw/Mn) of from 1:1 to about 1.3. Adhesives having outstanding properties result.

9 Claims, No Drawings

PRESSURE SENSITIVE ADHESIVE USING LIGHT COLOR, LOW SOFTENING POINT PETROLEUM HYDROCARBON RESINS

This invention relates to pressure sensitive adhesive utilizing a petroleum resin having excellent tackifying properties for block or random copolymers. More particularly, it relates to a petroleum resin having a number average molecular weight (Mn) of from 100 to 600, a softening from about 0° C. to about 40° C. and an aromatic component to impart compatibility with certain copolymers with the requisite tackification for pressure sensitive adhesives in a binary or tertiary system with copolymers. Even though including an aromatic component, the resin employed can be characterized by light color.

BACKGROUND OF THE INVENTION

Adhesives form a large part of daily activity for everyone, whether in the form of tape used to close a package or secure items together, bandages, envelopes, notepads, diaper tabs or any one of many other products in common use. The key requirements for adhesives are that they should have good cohesive and adhesive properties at conditions of use and application, whether by solvent or bulk casting. Usually these adhesives are prepared from a mixture of resin, copolymer and optionally a plasticizer to soften the adhesive and enhance tack.

Adhesives prepared from blends incorporated these components have very good adhesive and strength properties at room temperature and can be processed by conventional melt coating and extrusion techniques because of their good flow characteristics. Because of the excellent combination of properties exhibited by certain copolymers of a polydiene or a polyolefin and polystyrene, the use of such polymers for various pressure sensitive adhesive applications is growing in the industry.

Copolymers made from polystyrene and polydienes are widely used in the production of adhesives such as, for example, styrene/isoprene/styrene (SIS), polyethylene vinyl acetate (EVA), styrene/butadiene (SB), and styrene-ethylene butylene-styrene (SEBS), and the like. All of these copolymers whether formed by polymerization of polymer block or by random polymerization, are blended with tackifying resins in order to form the adhesive.

However, when copolymers are mixed with tackifying resins in order to form adhesives, many requirements and factors are important such as the ease with which the resin is blended with the copolymer and the control of the aggressiveness of the tack as well as the long term adhesive properties of the adhesive. Further, the adhesives industry has increased the demand for low softening point resins and market requirements dictate the desirability of resins which are not only liquid, i.e., softening point about 40° C. or less, but that are light in color, normally a Gardner color less than 3. However, a resin would be considered to have sufficiently low color for some applications with a Gardner color of 6 or even 7.

While non-aliphatic resins having very low color exist even to the point of being water white, the use of these resins to blend with some copolymers to form pressure sensitive adhesives, resins containing some aromaticity, and light color, are desired. The presence of an oil plasticizer can cause detrimental results to substrates to which the adhesive is applied. Attempts to incorporate aromaticity, and thus compatibility with the styrene portion of copolymers, to the resin have generally caused an unacceptably high color level making the resulting adhesive unsuitable for various uses.

Accordingly, it is an object of this invention to provide a pressure sensitive adhesive incorporating a low softening point, from 0° C. to about 40° C., and light color aromatic-containing hydrocarbon resin.

It is a further object of this invention to provide adhesives in a binary or tertiary system of a copolymer and a low softening point resin having a light color even while including aromatic substituents to enhance adhesive properties.

SUMMARY OF THE INVENTION

It has been discovered that a light color, low softening point resin polymerized in a Friedel Crafts reaction from a feedstock comprising: (a) from about 5% to about 75% by weight of $C_8$ to $C_{10}$ vinyl aromatic hydrocarbon stream; (b) from about 10% to about 35% by weight of a piperylene concentrate stream; and (c) from about 25% to about 70% by weight of a stream containing $C_4$ to $C_8$ monoolefin chain transfer agent of the formula $RR'C=CHR''$ where R and R', individually, are $C_1$ to $C_5$ alkyl, R'' is H or $C_1$ to $C_4$ alkyl group, in the presence of an aluminum chloride catalyst to produce a petroleum resin having a weight average molecular weight (Mw) of 110 to about 1600, (number average molecular weight Mn) of 100 to 600, a (Mw)/(Mn) ratio of from 1.1 to about 2.7, a softening point of from 0° C. to about 40° C. This resin can be blended with a wide range of copolymers, preferably in a binary system, to provide useful adhesives. The molecular weights are measured by a gel permeation chromatograph using a polyisobutylene standard and present a mono-modal peak on the chromatograph chart. The color of these resins ranges from less than about 1 to about 7 on the well known Gardner scale even though the resin has a vinyl aromatic content from about 10 weight percent to about 60 weight percent.

The resin described above has been found to be compatible and produce good pressure sensitive adhesives, with many copolymers such as, for example, styrene/isoprene/styrene (SIS), polyethylene vinyl acetate (EVA), styrene/butadiene (SB), and styrene-ethylene butylene-styrene (SEBS), and the like. Generally, to prepare the adhesives of this invention, the copolymer is mixed with from about 20% to about 80% by weight of the resin with the copolymer being, correspondingly, about 80% by weight to about 20% by weight of the resin and the balance being optional components as hereinafter mentioned even though such optional materials are well recognized. These properties will vary according to the copolymer involved, and the requirements of that copolymer to provide an adequate adhesive. As optional components, fillers and a hard resin having a softening point of about 80° C. or higher can be added in amounts of from 0 to 60% by weight in order to impart additional strength to the final adhesive. Examples of such hard resins could be aliphatic resins, aliphatic/aromatic resins, aromatic resins, terpene resins, terpene aliphatic resins, rosins, rosin derivatives and hydrogenated derivatives of the foregoing resins, and the like. These resins are well known to those skilled in preparing adhesives.

DETAILED DESCRIPTION OF THE INVENTION

In preparing the pressure sensitive adhesive of the invention, a resin having a softening point from 0° C. to about 40° C., and preferably from about 15° C. to about 30° C. and a color less than about a Gardner color of 7 (determined in a 50/50 solution with toluene), preferably less than 5, most preferably a Gardner color less than about 3 is used. The resin is formed from a hydrocarbon feedstock comprising as a first component a feed stream containing a $C_8$ to $C_{10}$ vinyl aromatic hydrocarbon stream, a heart cut distillate from stream cracked aromatic hydrocarbons having a boiling point range of from about 80° C. to about 260° C. or, preferably, pure styrene monomers, substituted styrene monomers or mixtures thereof. This component is present in amounts of from about 5% to about 75% by weight and preferably from about 10% to about 40% by weight of the polymerization feed.

Preferable ranges of the vinyl aromatic component depend largely upon the end use involved and the desired properties of the resins. As noted above, color depends, at least in part, on the purity of the aromatic stream. Thus, preferred applications where light color is needed dictate that fewer impurities be present in the vinyl aromatic hydrocarbon stream even though the impurities are also hydrocarbons which act as a diluent in the reaction and are removed after the resin is formed. When a resin having a softening point of from 15° C. to about 30° C. and a Gardner color of about 2 or less is desired, the preferred range of the vinyl aromatic component in the finished resin would be from about 10 to about 60 weight percent. The vinyl aromatic monomer content of the feed to achieve this aromatic content in the resin is from about 5 to about 35 parts by weight in the feed.

Included as the second component is from about 10% to about 35% by weight, preferably from about 10% to about 26% and most preferably from about 12% to about 16% by weight, of a piperylene concentrate resulting from the isolation of a fraction of steam cracked petroleum hydrocarbons which boils between about 20° C. to about 140° C., said fraction containing diolefins being substantially below the nine carbon atom level. Piperylene concentrates have long been used in the preparation of resins along with the $C_5$ or $C_6$ olefins or diolefins, or mixtures thereof. Preferably, such fraction is heat soaked as well known and described in U.S. Pat. No. 4,391,961, such disclosure being incorporated herein by reference for all purposes. The piperylene concentrate hereinafter sometimes referred to as heat soaked piperylene, when incorporated into the resin, imparts a lower color to the resulting resin. While the piperylene concentrate can be used without heat soaking to produce the low softening point resin, a heat soaking step improves color. Piperylene concentrates as will be shown later contain hydrocarbons which do not enter into the resin-forming reaction. The presence of unreactive materials normally do no harm to the resin, during reaction, act as a diluent to be removed when the resin is recovered.

The third component of the resin feed stream is a chain transfer agent comprising a stream containing $C_4$ to $C_8$ monoolefin chain transfer agents of the general formula $RR'C=CHR''$ where R and R' are $C_1$ to $C_5$ alkyl, and R'' is H or $C_1$ to $C_4$ alkyl group. Useful chain transfer agents are, for example, isobutenes, isoamylenes, isohexenes and diisobutenes. The isoamylenes particularly useful are described in U.S. Pat. No. 4,514,554, the disclosure of which is incorporated by reference herein for all purposes. These are usually concentrates containing the various isomers desired from distillation cuts, well known to those skilled in the art, as well as mixtures made from pure compounds.

Particularly useful as the chain transfer agent to prepare the resin useful in the instant invention is the mixture containing an isohexene isomers resulting from the dimerization of propylene in the well known "Dimersol" process using a nickel coordination complex and an aluminum alkyl catalyst. The process can convert propylene to hexenes with selectivity in excess of 85%. The Dimersol ® dimerization process has been referred to in various publications, e.g., see "How First Dimersol is Working" by Benedek et al., Hydrocarbon Processing, May 1980, page 143; also Chauvin et al., "The IFP Dimersol ® Process for the Dimerization of $C_3$ and $C_4$ Olefinic Cuts", Advances in Petrochemical Technology, presented at American Institute of Chemical Engineers, Apr. 13, 1976, Kansas City, Mo.

While it is known that the pure compounds and isomers making up the aforementioned $C_4$ to $C_8$ monoolefin chain transfer agent streams are useful as chain transfer agents, one may use mixtures of isomers and reaction products containing such isomers in the adhesives of this invention, those including the isohexenes produced by the "Dimersol" dimerization process being preferred.

Hexenes, as produced by dimerization of propylene with transition metal catalyst, as in the Dimersol ® dimerization process, are characterized by being composed mainly of internal olefins, and a linear content which has a range from about 20% up to 32% or so by weight. The main isomer present is a 2-methyl-2-pentene, along with other 2- and 4-methyl pentenes and around 6% 2,3-dimethyl-2-butene. Some $C_9$ trimer, about 15%, is also produced in the process. It is not necessary to separate the trimers from the isohexene mixtures in the practice of this invention.

The chain transfer agent stream is present in the polymerization reaction mixture in an amount of from about 25% to about 70% by weight with 45% to about 65% by weight being preferred depending upon the properties finally desired.

In carrying out the polymerization reaction, the hydrocarbon mixture is brought into contact with an aluminum chloride-containing catalyst with anhydrous aluminum chloride catalyst being preferred. Generally, the catalyst is used in articulate form having a particle size in the range of from about 5 to about 200 mesh size, although larger or smaller particles can be used. The amount of catalyst used ranges from about 0.5% to about 2.0% by weight, preferably 1.0% to 2.0% by weight. The catalyst may be added to the hydrocarbon mixture or the hydrocarbon mixture may be added to the catalyst. The reaction can be conducted continuously or by batch process techniques generally known to those skilled in the art.

The reaction should also be carried out at a pressure of from 10 psi (0.7 Kg/cm$^2$) to 80 psi (56 Kg/cm$^2$), preferably 20 (1.4 Kg/cm$^2$), psi. The temperature of the reaction ranges from about 20° C. to 100° C., more usefully from 30° C. to 60° C., and most preferably from about 35° C. to about 50° C. The time of polymerization ranges from one-fourth to 2.0 hours, preferably from 20 minutes to 1 hour.

The reaction is conveniently carried out in the presence of a diluent because the reaction is usually exothermic and the resulting product is viscous. However, with adequate mixing and cooling, the temperature can be controlled and reaction conducted with only sufficient diluent to maintain good heat transfer for the heat of polymerization. The diluent may be introduced as a part of the feedstock streams where concentrates, reaction mixtures and distillation fractions are used, but various other diluents which are inert in that they do not enter into the polymerization reaction may be separately added. Representative examples of inert diluents are aliphatic hydrocarbons such as pentane, hexane and heptane, aromatic hydrocarbons such as xylene, toluene and benzene, and unreacted residual hydrocarbons from the reaction may be useful as diluent.

After the polymerization is complete, the catalyst is quenched by well known mean, usually by adding a water and alcohol solution followed by resin recovery which involves stripping of unreacted hydrocarbons, including diluent from the resin as known by those skilled in preparing such resins. This "finishing" step is usually carried out by heating, in a nitrogen atmosphere, usually to about 250° C., followed by steam stripping to remove unreacted material and low molecular weight resin ("fill"). The degree of stripping can be varied somewhat as desired to make small adjustments to the softening point. The raffinate removed can be saved and used as the diluent for other polymerization reactions to form resins.

The resin obtained by the above-identified polymerization process using the feedstock herein described can have a wide variety of properties within the scope of the aforesaid parameters (they will still have light color and a low softening point between 0° C. and 40° C.) by varying feedstock selection. For example, if a Gardner color of 6 to 8 can be tolerated in the adhesive, then (1) the vinyl aromatic feed stream can be derived from a distillation cut boiling in the range of from about 80° C. to about 260° C. from a steam cracked aromatic hydrocarbon stream; and (2) a piperylene concentrate ($C_5$ olefin and diolefin mixture) which is not heat soaked can be used. If slightly better color, i.e., Gardner 3 to 6 is desired, then a styrene concentrate, i.e., a distillation stream containing predominantly styrene and its various substituted styrene materials such as alpha-methylstyrene, para-methylstyrene or vinyl-toluenes may be used. Finally, if Gardner color less than 3 is desired, then it is preferred to use pure styrene or substituted styrene monomers, with styrene, alpha-methyl styrene or mixtures thereof being preferred. When these monomers or mixtures of pure monomers are used with a heat soaked piperylene concentrate, a preferred resin results having a color of 2 or less on the Gardner scale, a molecular weight distribution of from 1.15 to 1.25 and a softening point of from 15° C. to 30° C. can be obtained. These resins may be incorporated into copolymers using well known methods to form adhesives having highly desirable properties.

The following examples are offered by way of explanation for the purposes of guiding those skilled in the art to prepare resins useful in the practice of this invention.

EXAMPLES 1-4

The liquid resins of Examples 1-4 were polymerized batchwise using aluminum chloride catalyst in a nitrogen atmosphere at about 12 psig (0.84 Kg/cm²). The aluminum chloride catalyst (having particulate size between 5 and about 200 mesh) is added in anhydrous form. In these polymerizations, 400 grams of feed blend, in proportions indicated in Table 1, were pumped into a closed, stirred reactor containing catalyst, over a thirty minute period of time and then left in contact with the catalyst for an additional thirty minutes with stirring. A 400 gram 1:3 solution of isopropanol:water was added to the reaction mixture to quench the catalyst and the polymerizate was washed two to three additional times with the aqueous phase being separated after each wash.

The polymerizate was finished by heating to 250° C. in a nitrogen atmosphere to remove unreacted material. The polymerizate was then steam stripped at 250° C. to produce the finished resin.

In Examples 1-4, the xylenes, styrene, p-methylstyrene, mixed methyl styrenes and alpha-methylstyrene components were of at least 96% purity. The compositions of the heat soaked piperylene concentrate and isoamylene concentrate used are shown below:

|  | Piperylene Concentrate | Methylbutene Concentrate |
|---|---|---|
| Pentene-1 | 1.8 | 33.6 |
| Pentene-2[1] | 8.7 | 26.3 |
| 2 Methylbutene-1 | 0.1 | 29.6 |
| 2 Methylbutene-2 | 3.2 | 3.3 |
| Cyclopentene | 12.2 | — |
| Pentadiene-1,3[1] | 19.9 | — |
| Low reactivity olefins and nonreactive paraffins | 54.1 | 7.2 |

[1]cis and trans isomers

These examples show the influence of aromatic olefin structure on resin properties. Resin properties are shown in Table 1 below:

TABLE 1

| Example | 1 | 2 | 3 | 4 |
|---|---|---|---|---|
| Feed Composition (parts by weight) | | | | |
| Isoamylene Concentrate | 50 | → | → | → |
| Piperylene Concentrate | 21.4 | → | → | → |
| Styrene | 28.6 | — | — | — |
| P—Methylstyrene | — | 28.6 | — | — |
| Mixed Methylstyrenes Meta-60% Para-40% | — | — | 28.6 | — |
| Alpha-Methylstyrene | — | — | — | 28.6 |
| Xylenes | 42.9 | → | → | → |
| Polymerization | | | | |
| Catalyst, wt % | 1.4 | → | → | → |
| Reactor Temperature, °C. | 45 | → | → | → |
| Reactor Pressure, psig | 12 | → | → | → |
| Resin Finishing | | | | |
| Resin Yield, wt % | 37.1 | 37.6 | 38.5 | 22.6 |
| Resin Properties | | | | |
| Softening Point, °C. | 21 | 36 | 22.5 | 15 |
| Cloud Point, °C. 20/40/40 (a) | <70 | → | → | → |
| Gardner Color (b) | 3.5 | 3.5 | 4.5 | 6.5 |
| GPC Molecular Weight | | | | |
| Mn | 135 | 197 | 142 | 125 |
| Mw | 210 | 403 | 232 | 195 |
| Mw/Mn | 1.56 | 2.05 | 1.63 | 1.56 |

(a) The temperature at which there is an appearance of haze or "cloud" in a mix of 40 parts 60° C. melt point paraffin wax, 20 parts of Escorene ® 7750 (ethylene vinylacetate, 28% vinylacetate) from Exxon Chemical Company and 40 parts test resin heated to 200° C. and allowed to cool in air with stirring.
(b) 50 wt % resin solution in toluene with comparator discs.

The ring and ball softening points of the resins were determined using a modified ASTM E-28 procedure. The softening point was measured in a 50/50 ethylene glycol/water solution. The rings were kept in a −25° to −30° C. environment until the ethylene glycol/water solution was cooled to that temperature range. The ring and ball softening point apparatus was assembled and heated at 5° C./min. The softening point temperature was then read according to the ASTM E-28 procedure.

EXAMPLES 5-7

In Examples 5-7, a styrene concentrate fraction of steam cracked naphtha boiling within the range of from 80° C. to 190° C. was used with the isoamylene and piperylene concentrate to prepare resins in the manner described in Examples 1-4 above in proportions as set forth in Table 3. The compositions of the styrene concentrates are shown in Table 2 below:

TABLE 2

| COMPOSITION OF STYRENE CONCENTRATES | | | |
|---|---|---|---|
| Component | I | II | III |
| Ethyl Benzene | 4.6 | 2.6 | 6.5 |
| O, M, P—Xylene | 30.3 | 24.8 | 40.5 |
| Styrene | 28.8 | 26.5 | 33.6 |
| Alpha-Methylstyrene | 3.0 | 4.3 | 1.2 |
| Vinyl Toluenes | 5.1 | 7.6 | 1.5 |
| Other Alkyl substituted Benzenes | 28.2 | 34.2 | 16.7 |

These resins were polymerized and finished, and the softening points were determined using the same procedures discussed in Examples 1-4. These examples show the effect on color of the resin used to form the adhesives by using various styrene concentrates. The results of testing of the resins of Examples 5-7 polymerized with styrene concentrates I-III are shown in Table 3.

TABLE 3

| Examples | 5 | 6 | 7 |
|---|---|---|---|
| Feed Composition (parts by weight) | | | |
| Isoamylene Concentrate | 55 | 55 | 55 |
| Piperylene Concentrate | 15 | 15 | 15 |
| Styrene Concentrate I | 30 | — | — |
| Styrene Concentrate II | — | 30 | — |
| Styrene Concentrate III | — | — | 30 |
| Polymerization | | | |
| Catalyst, wt % | 2.0 | 1.4 | 1.0 |
| Reactor Temperature | 45 | 45 | 45 |
| Reactor Pressure, psig | 12 | 12 | 12 |
| Resin Finishing | | | |
| Resin Yield, wt % | 21.4 | 29.3 | 29.5 |

TABLE 3-continued

| Examples | 5 | 6 | 7 |
|---|---|---|---|
| Severity of Finishing, % of Normal Steam | 60 | 60 | 60 |
| Resin Properties | | | |
| Softening Point, °C. | 29 | 21 | 13 |
| Gardner Color | 10.5 | 10 | 6 |
| GPC Molecular Weight | | | |
| Mn | 183 | 304 | 280 |
| Mw | 333 | 432 | 372 |
| Mw/Mn | 1.82 | 1.42 | 1.33 |

EXAMPLES 8-14

In Examples 8-14, a mixed $C_6$ monoolefin stream prepared from the dimerization of a propylene stream was used in place of isoamylene concentrate in resins produced as described in Examples 1-4 above. Typical compositions of the $C_6$ olefin stream and the piperylene concentrate used in these examples follow:

Typical composition of Mixed $C_6$ Olefin Stream, %*
2-Methyl-1-Pentene: 3.9,
2-Methyl-2-Pentene: 25.9,
2,3-Dimethyl-1-Butene: 2.8,
2,3-Dimethyl-2-Butene: 2.7,
Other $C_6$ Olefins: 50.5,
$C_9$ Olefins: 14.2.

*"Dimate", from Diamond Shamrock, produced by dimerization of propylene.

Typical Composition of Heat Soaked Piperylene Concentrate, %
1-Pentene: 2.5,
Cis and trans-2-Pentene: 6.5,
2-Methyl-1-Butene: 0.2,
2-Methyl-2-Butene: 3.7,
Cyclopentene: 17.4,
Cis and trans-Piperylene: 28.8,
Low reactivity olefins and nonreactive paraffins : 40.9.

In these Examples, pure styrene and alpha-methylstyrene monomerswere used as the vinyl aromatic hydrocarbon stream resulting in resins having an aromatic vinyl content of from about 10 weight percent to about 60 weight percent and a Gardner color of about 1. The feedstock composition and resin properties are shown in Table 4 below. These resins are particularly useful to prepare adhesives in the practice of this invention.

TABLE 4

| Example | 8 | 9 | 10 | 11 | 12 | 13 | 14 |
|---|---|---|---|---|---|---|---|
| Feed Composition (parts by wt) | | | | | | | |
| $C_6$ Olefins ("Dimate") | 69.4 | 36.5 | 59.5 | 59.5 | 50.8 | 66 | 43.9 |
| Piperylene Concentrate (1) | 25.2 | 13.7 | 22.5 | 22.5 | 19 | 24 | 16.4 |
| Styrene | 3.6 | 32.6 | 12 | 18 | 25.4 | 6.7 | 32.9 |
| Alpha-Methylstyrene | 1.8 | 17.1 | 6 | — | 4.8 | 3.3 | 6.8 |
| Paraffinic Diluent | — | 46.2 | 49.2 | — | 58.7 | — | 37.0 |
| Polymerization | | | | | | | |
| Catalyst, wt % | 1.2 | 1.2 | 1.2 | 1.2 | 1.2 | 1.2 | 1.5 |
| Reactor Temperature, °C., | 40 | 40 | 40 | 40 | 40 | 40 | 40 |
| Reactor Pressure, psig | 10 | 10 | 10 | 10 | 10 | 10 | 10 |
| Resin Finishing | | | | | | | |
| Resin Yield, wt % | 24 | 50 | 30 | 37 | 36 | 28.3 | 46.3 |
| Fill, wt % | 1 | — | 4 | 4 | 4 | 7.1 | 4.3 |
| Resin Properties | | | | | | | |
| Softening Point, °C., | 20 | 21 | 17 | 23.5 | 24 | 23.5 | 29 |
| Cloud Point, °C. | 66 | 65 | 65 | 65 | 69 | 65 | 65 |
| Gardner Color | 1+ | 1+ | 1+ | 1+ | 1+ | 1− | 1− |
| Vinyl Aromatic Content, wt % | 12 | 59 | 34 | — | 45 | 25 | 51 |

TABLE 4-continued

| Example | 8 | 9 | 10 | 11 | 12 | 13 | 14 |
|---|---|---|---|---|---|---|---|
| GPC Molecular Weight | | | | | | | |
| Mn | 426 | 362 | 445 | 396 | 472 | 399 | 406 |
| Mw | 521 | 443 | 522 | 453 | 578 | 467 | 499 |
| Mw/Mn | 1.22 | 1.22 | 1.17 | 1.14 | 1.22 | 1.17 | 1.23 |

(1) Heat soaked

The low softening point liquid resins described above are all applicable in the practice of the instant invention to make adhesives when combined with a copolymer. Such applicable resins are further described in the co-pending application Ser. No. 830,409 (SP-1082) filed of even date herewith for "Light Color, Low Softening Point Petroleum Hydrocarbon Resins". The copolymers useful for the practice of this invention are generally known as, for example, styrene/isoprene/styrene (SIS), polyethylene vinyl acetate (EVA) (from about 25% to about 45% by weight vinyl acetate), styrene/butadiene (SB) and styrene-ethylene butylene-styrene (SEBS), and the like. Of particular interest are the styrene/butadiene copolymers which are classically more difficult to tackify than other polymers using a resin and often require not only a tackifier but an oil to act as a plasticizer thus giving rise to the problem of "bleed" and/or "creep" when the adhesive is applied to a paper or polymer substrate. When the need is for a light color, essentially water white resin, previously only resins prepared from nonaromatic materials were available since aromaticity had heretofore imparted color to the resin which was unacceptable for certain applications, including premium packaging and disposable diapers. The presence of an oil in the adhesive composition has other detrimental effects such as unacceptable creep and bond release along a polyethylene film, particularly in a case where disposable diapers are involved. Thus, the resins described above, particularly those of Examples 8-14 which can be used with styrene/butadiene resins in a binary system, i.e., by eliminating the plasticizer, are particularly useful.

Well known styrene/butadiene copolymers useful in the practice of this invention are those sold by shell under the "Kraton" trademark and by Firestone under the "Stereon" trademark. Both of these are styrene/butadiene copolymers which form particularly attractive adhesives when used in combination with the above-identified resins, particularly the very low color resins of Examples 8-14 having a softening point of around 20° C. The "Stereon" copolymer grade 840A is a copolymer containing 42% styrene. In formulating the adhesive, the liquid resin is present in amounts from 20% to 80% by weight with the copolymer which is present in, correspondingly, 80% to 20%. The preferred adhesive would contain from about 30% to about 70% by weight of the resins with from about 35% to about 50% by weight in the adhesive being especially preferred. In binary adhesives, the copolymer will be present in corresponding amounts. However, other components may be present. Optionally, a resin having a higher softening point, from about 80° C. to about 120° C., may be used as an additional component of the adhesive composition. While the preferred adhesive is a binary system comprising two reactants, the copolymer and the light color resins described herein, such binary system may still include such nonreactive ingredients as fillers, inhibitors, and the like. Representative of fillers would be, for example, calcium carbonate, titanium oxides, finely divided clays, talc and the like.

Once blended using methods and techniques well known to those skilled in the art, the adhesive would be coated on a substrate such as "Mylar" film (Dupont Company) or "Endura" film (Akrosil). The adhesive is then evaluated in terms of those parameters important to adhesives such as rolling ball tack, polyken tack, peel strength, holding power and aged retention of these properties.

The adhesive compositions of the present invention may be applied to a substrate and, if solvent coated, dried using conventional procedures. The substrate used depends upon the anticipated use, but it is usually relatively thin material, usually no greater than about 3.2 mm in thickness, and in the manufacture of tapes and labels, the substrate is a relatively thin sheet material. The sheet material may be a polymeric material which is flexible at about room temperature. The sheet material may be a homo-polymer of an ethylenically unsaturated monomer such as ethylene, propylene or vinyl chloride, or be polyester, polyacetate or polyamide provided it has sufficient flexibility for the desired end use. Alternatively, the substrate may be made from cellulosic or reconstituted cellulosic material such as rayon. The substrate need not be a sheet material but may be composed of fibers which may be woven, or nonwoven as is the case in paper. woven substrates may be made from cellulosic material, such as cotton or from fibers of any of the above mentioned polymers.

The composition is applied to the substrate using conventional coating techniques such as roller coaters, blade coaters, meyer rods or air coaters. The coated substrate can be dried usually by passing it through a heating tunnel or oven through which may be circulating hot air or the tunnel or oven may contain infrared lamps to dry the coated substrate. The drying time will be a function of a number of factors such as the heat capacity of the substrate, the type of heating, the oven temperature, air velocities (if circulating air is used) and the rate of passage of the substrate through the heater.

The substrate should be coated with sufficient composition to provide a dry coat weight from about 16 to about 57 g/cm$^2$. Generally in the manufacture of tapes using a continuous sheet polymeric substrate, a dry coat weight of about 15-30 g/cm$^2$ is used. In the manufacture of labels, a dry coat weight from about 15 to 30 g/cm$^2$ is usually used. In the manufacture of masking tape, a dry coat weight from about 35 to about 65 g/cm$^2$ is usually used.

After drying, the coated substrate is cut to the required dimension. In the manufacture of tape, the substrate is cut into strips and rolled to provide a finished product. The substrate may also be cut into shaped items to provide labels or medicinal tapes.

One particularly attractive use for the pressure sensitive adhesives of the present invention is in diaper tabs for disposable diapers, particularly repositional tabs which employ a "Mylar" polymer substrate coated as stated above with 1.5 mil adhesive as shown in Table 5 below.

TABLE 5

| Adhesion Testing of Commercial Disposable Diaper Tabs | | |
|---|---|---|
| Product | Commercial Tab "1" | Commercial Tab "2" |
| Polyken Tack (g) | | |
| Initial | 291 | 407 |
| Aged (2) | 451 | 487 |
| 180° Peel Strength (lb/in) | | |
| Stainless Steel | | |
| Initial | 6.28 | 5.75 |
| Aged (2) | 6.00 | 2.25 |
| Polyethylene (3) | | |
| Initial | 1.63 | 1.63 |
| Aged (2) | 1.40 | 0.80 |
| Repeat Polyethylene (4) | | |
| Initial | 1.67 | SF (6) |
| Aged (2) | 1.50 | 1.23 |
| Loop Tack (lb/in) | | |
| Stainless Steel | | |
| Initial | 3.42 | 2.42 |
| Aged (2) | 0.75 | 2.00 |
| 178° Holding Power (5) | | |
| Stainless Steel | | |
| Initial | 2.61 | 14.99 |
| Aged (2) | 0.26 | 13.11 |

(1) 1.5 mil drawdown on 0.01 g/cm² backing
(2) Aging Conditions: 2 weeks at 158° F.
(3) 10 mil polyethylene film (from Tab "1")
(4) 2 hours at room temperature
(5) ½" × ½", 1 kg
(6) Substrate Failure The mechanical preparation of the adhesives of this invention are well known to those skilled in the art. In addition to the components which make up the adhesives of this invention, i.e., the copolymers and the low softening, light color resin described above, other materials, well known to those skilled in the art may be added without departing from the invention such as, for example, fillers or resins having higher melting points such as, for example, from about 80° C. to about 120° C. in order to impart additional strength to the resulting pressure sensitive adhesive. In some applications, it may be desirable to add up to about 60 weight percent of such "hard" resin such as that described in U.S. Pat. No. 4,514,554 for example, the disclosure of which is incorporated herein by reference, and U.S. Pat. No. 4,391,961. Both provide often desirable modifications of the pressure sensitive adhesive of this invention.

Preferred adhesives made with a styrene/butadiene copolymer having from about 40% to about 50% styrene are preferred. In use, the adhesives are applied to a polyacetate or cellulose backing in a thickness of from 0.7 to 1.5 mil. To illustrate the present invention, adhesives were made by mixing a styrene/butadiene copolymer having 42% styrene polymer ("Stereon" Resins from Firestone) with resins similar to, and prepared in the same manner as, those of Examples 10 and 12 and commercially available resins useful to produce adhesives with such styrene/butadiene copolymer. The characteristics of the liquid resins compared are set forth in Table 6.

TABLE 6

| | Comparison of Liquid Resins with Styrene/Butadiene Copolymer (Stereon ® 840A) | | | | | |
|---|---|---|---|---|---|---|
| Type | Exp 10 (15% Aromatic) Aromatic/ Aliphatic | Exp 12 (30% Aromatic) Aromatic/ Aliphatic | Regalrez 101B (Hercules) Hydrogenated Aliphatic | Hercolyn D (Hercules) Rosin Ester | Zonarez A-25 (Arizona) Terpene/ Oil | Wingtack 10 (Goodyear) Aliphatic |
| Softening Point (°C.) | 22 | 24 | 17 | 0 | 20 | 8.5 |
| Cloud Point (1) | 97 | 100 | 100 | 98 | 97 | 109 |
| Viscosity (cps) | | | | | | |
| −100° F. | 22950 | 24000 | 17750 | 895 | 20100 | 5713 |
| −200° F. | 99 | 123 | 83 | 19 | 67 | 58 |
| Gardner Color (2) | | | | | | |
| Initial | 2− | 1.5 | <1 | 2+ | 2+ | 1 |
| Aged (16 Hrs/300° F.) | 4+ (3) | 5− (3) | 2− | 11 | 13− | 9+ |
| Mw | 577 | 518 | 383 | 252 (bimodal) | 416 (trimodal) | 623 |
| Mn | 492 | 518 | 346 | 235 | 346 | 531 |
| Mw/Mn | 1.17 | 1.17 | 1.11 | 1.07 | 1.20 | 1.17 |
| Volatility (wt % loss) | | | | | | |
| 10 g/5 Hr/ 350° F. (4) | 6–7 | 6–7 | 11.3 | >20 | 18.1 | 14.1 |

(1) Multiwax 195 (microcrystalline wax - M.P. 195° F.) - 33 wt %; Elvax 150 (wax - M.P. 150° F.) - 27; Resin - 40.
(2) 50% in toluene.
(3) Inhibited with Irganox 1010 at 0.15 wt %.
(4) 3" diameter aluminum dish.

These resins as shown are used in preparing a repositional diaper tab in varying proportions of resin to copolymer in the manner of mixing well known to those skilled in the art. The adhesive was applied in the amount of 1.5 mil drawdown on 0.005 g/cm² "Mylar" polyacetate film backing. The test results are as shown in Table 7 and Table 8.

TABLE 7
LIQUID RESINS COMPARISONS PERFORMANCE IN STEREON 840A COPOLYMER REPOSITIONABLE DIAPER TABS
Aging Conditions: 2 weeks at 158° F.
1.5 ml drawdown on .005 g/cm² mylar backing

| Formulation (1) wt % | | Rolling Ball Tack cm | | Polyken Tack g | | Loop Tack lb/in SS | | 178° Holding Power hr SS, ¼" × ½", 1kg | |
|---|---|---|---|---|---|---|---|---|---|
| | Copolymer Resin | Initial | Aged | Initial | Aged | Initial | Aged | Initial | Aged |
| Resin of Example 10 | 80 20 | >30.0 | >30.0 | <10 | <10 | <.01 | <.01 | >100.0 | 0.0 |
| | 65 35 | 7.2 | 8.8 | 174 | 237 | 0.13 | 0.12 | >100.0 | >100.0 |
| | 50 50 | 3.1 | 2.0 | 812 | 718 | 0.85 | 0.72 | >100.0 | 2.6 |
| | 35 65 | 2.7 | 2.3 | 997 | 1000 | 3.41 | 1.08 | 2.6 | 0.3 |
| | 20 80 | 2.4 | 2.3 | 1357 | 1192 | 3.29 | 2.90 | 0.4 | 0.3 |
| Zonarez A-25 | 80 20 | >30.0 | >30.0 | <10 | <10 | <.01 | <.01 | >100.0 | 0.0 |
| | 65 35 | 4.7 | 12.7 | 262 | 205 | 0.15 | 0.17 | >100.0 | >100.0 |
| | 50 50 | 3.1 | 3.3 | 659 | 468 | 0.27 | 0.62 | >100.0 | 3.4 |
| | 35 65 | 2.5 | 2.1 | 721 | 602 | 0.55 | 0.95 | 0.9 | 0.4 |
| | 20 80 | 2.3 | 2.7 | 843 | 736 | 1.20 | 0.62 | 0.2 | 0.2 |
| Regalrez 1018 | 80 20 | >30.0 | >30.0 | 71 | <10 | <.01 | <.01 | >100.0 | 0.0 |
| | 65 35 | 5.6 | 9.4 | 457 | 198 | 0.50 | 0.16 | >100.0 | >100.0 |
| | 50 50 | 3.2 | 2.8 | 948 | 685 | 1.08 | 0.93 | >100.0 | 2.6 |
| | 35 65 | 2.5 | 2.2 | 1009 | 1017 | 1.43 | 1.50 | 0.6 | 0.5 |
| | 20 80 | 1.7 | 2.6 | 1103 | 940 | 3.29 | 1.95 | 0.5 | 0.5 |

| Formulation (1) wt % | | 180° Peel Strength lb/in (20 wks, 140° F.) | | | | Repeat Polyethylene 2 hrs | | |
|---|---|---|---|---|---|---|---|---|
| | | Stainless Steel (SS) | | Polyethylene (2) | | | | |
| | Copolymer Resin | Initial | Aged | Initial | Aged | Initial | Aged | Staining |
| Resins of Example 10 | 80 20 | 0.63 | 0.00 | 0.00 | 0.00 | | | |
| | 65 35 | 0.30 | 0.08 | 0.00 | 0.00 | | | |
| | 50 50 | 2.40 | 1.80 | 0.68 | 0.23 | 0.70 | 0.24 | None |
| | 35 65 | 2.82 | 2.02 | 0.95 | 0.72 | 0.98 | 0.70 | Slight |
| | 20 80 | 7.47 | 7.38 | SF (3) | 1.65 | | SF | |
| Zonarez A25 | 80 20 | 0.00 | 0.00 | 0 00 | 0 00 | | | |
| | 65 35 | 0.32 | 0.00 | 0.00 | 0.00 | | | |
| | 50 50 | 1.15 | 0.48 | 0.30 | 0.00 | 0.70 | | None |
| | 35 65 | 1.45 | 0.77 | 0.50 | 0.00 | 0.80 | 0.35 | Heavy |
| | 20 80 | 3.19 | 1.33 | SF | 0.25 | | | |
| Regalrez 1018 | 80 20 | 0.17 | 0.00 | 0.00 | 0.00 | | | |
| | 65 35 | 1.18 | 0.17 | 0.00 | 0.00 | | | |
| | 50 50 | 1.92 | 1.53 | 0.65 | 0.25 | 0.58 | 0.15 | None |
| | 35 65 | 2.58 | 1.88 | 0.93 | 0.77 | 1.50 | 0.80 | Slight |
| | 20 80 | 6.18 | 4.83 | SF | 0.70 | | SF | |

(1) Includes 0.5 wt % Irganox 1010
(2) 1 ml thick polyethylene (PE) film from Commercial Tab "1"
(3) Substrate Failure To further demonstrate the advantages of this invention, a pressure sensitive adhesive is described below using the above described liquid resin, the styrene/butadiene copolymer, and a commercially available inhibitor. The 20° C. softening point liquid resin is similar to the one described in Examples 10 and 12 with the properties as shown in Table 8.

TABLE 8
REMOVABLE PRESSURE SENSITIVE ADHESIVES

| | | | |
|---|---|---|---|
| Liquid Resin from Examples 8-14 | | 60 | 67 |
| Stereon ® 840A styrene-butadiene copolymer (42% Styrene) | | 40 | 33 |
| Irganox ® 1010 inhibitor | | 0.5 | 0.5 |
| | Initial | Aged | Initial | Aged |
| Rolling Ball Tack (cm) | 3.0 | 3.5 | 2.8 | 3.1 |
| Polyken Tack (g) | 664 | 491 | 770 | 521 |
| 180° Peel Strength (lb/in) | | | | |
| to SS | 1.48 | 1.07 | 1.44 | 1.79 |
| to PE (10 ml, untreated) | 1.00 | 0.42 | 1.15 | 1.13 |
| Loop Tack (lb/in) | | | | |
| to SS | 0.35 | 0.35 | 0.66 | 0.75 |
| To PE (10 ml, untreated) | 0.60 | 0.68 | 0.28 | 0.56 |
| SAFT to SS (°F.) | 132 | 123 | 123 | 126 |

TABLE 8-continued
REMOVABLE PRESSURE SENSITIVE ADHESIVES

| | | | | |
|---|---|---|---|---|
| 178° Holding Power (hrs) (½" × ½" × 2,000 g) | 9.5 | 27.9 | 3.9 | 3.7 |

As seen from the foregoing, the pressure sensitive adhesive of the present invention provides considerable advantage over other pressure sensitive adhesives made with available liquid resins.

The foregoing disclosure and description of the invention are illustrative and explanatory thereof, and various changes in the components, parameters and proportions, as well as in the details of the illustrated examples, may be made without departing from the spirit and scope of the claimed invention.

What is claimed is:

1. An adhesive composition comprising from about 20% to about 80% by weight of a copolymer and, correspondingly, from about 80% to about 20% by weight of a tackifying petroleum hydrocarbon resin having a softening point of from 0° C. to about 40° C., a number average molecular weight of from about 100 to about 600, and a Gardner color less than about 7 prepared by the aluminum chloride ctatlyzed Friedel Crafts polymerization of a hydrocarbon feed comprising:
- (a) from about 5% to about 75% by weight of $C_8$ to $C_{10}$ vinyl aromatic hydrocarbon stream;
- (b) from about 10% to about 35% by weight of a piperylene concentrate; and
- (c) from about 25% to about 70% by weight of a $C_4$ to $C_8$ monoolefin chain transfer agent of the formula $RR'C=CHR''$ where R and R' are $C_1$ to $C_5$ alkyl, and R'' is H or $C_1$ to $C_4$ alkyl group.

2. The adhesive of claim 1 wherein the adhesive comprises from about 35% to about 50% by weight of the resin and a styrene/butadiene copolymer.

3. The adhesive of claim 1 which also comprises up to about 60 wt % of a resin having a softening point of from about 80° C. to about 120° C.

4. The adhesive of claim 3 wherein said resin is aliphatic, aliphatic/aromatic, terpenic, terpenic/aliphatic, terpenic/aromatic, rosin ester, or a hydrogenated product thereof.

5. The adhesive of claim 3 which also includes up to about 50% by weight of an inert filler.

6. An adhesive composition comprising from about 50% to about 65% by weight of styrene/butadiene copolymer and, correspondingly, from about 50% to about 35% by weight of a petroleum hydrocarbon resin having a softening point of from 10° C. to about 30° C., a Gardner color of 3 or less and a molecular weight distribution of from about 1.1 to about 1.3 with number average molecular weight of from about 100 to about 600; being an aluminum chloride catalyzed resin from a reaction mixture comprising:
- (a) from about 5 to about 35 parts by weight of alpha-methyl styrene, styrene or mixtures thereof;
- (b) from about 10 to about 26 parts by weight of a heat soaked piperylene concentrate; and
- (c) from about 25 to about 70 parts by weight of a mixed $C_6$ monoolefin stream prepared from the dimerization of propylene.

7. The adhesive composition of claim 6 wherein the reaction mixture from which the resin is formed is a mixture of substantially pure styrene and alpha-methyl styrene monomers.

8. The adhesive composition of claim 1 wherein said hydrocarbon feed consists essentially of the three components (a), (b), and (c).

9. The adhesive composition of claim 6 wherein said reaction mixture consists essentially of the three reaction components (a), (b), and (c).

* * * * *